UNITED STATES PATENT OFFICE.

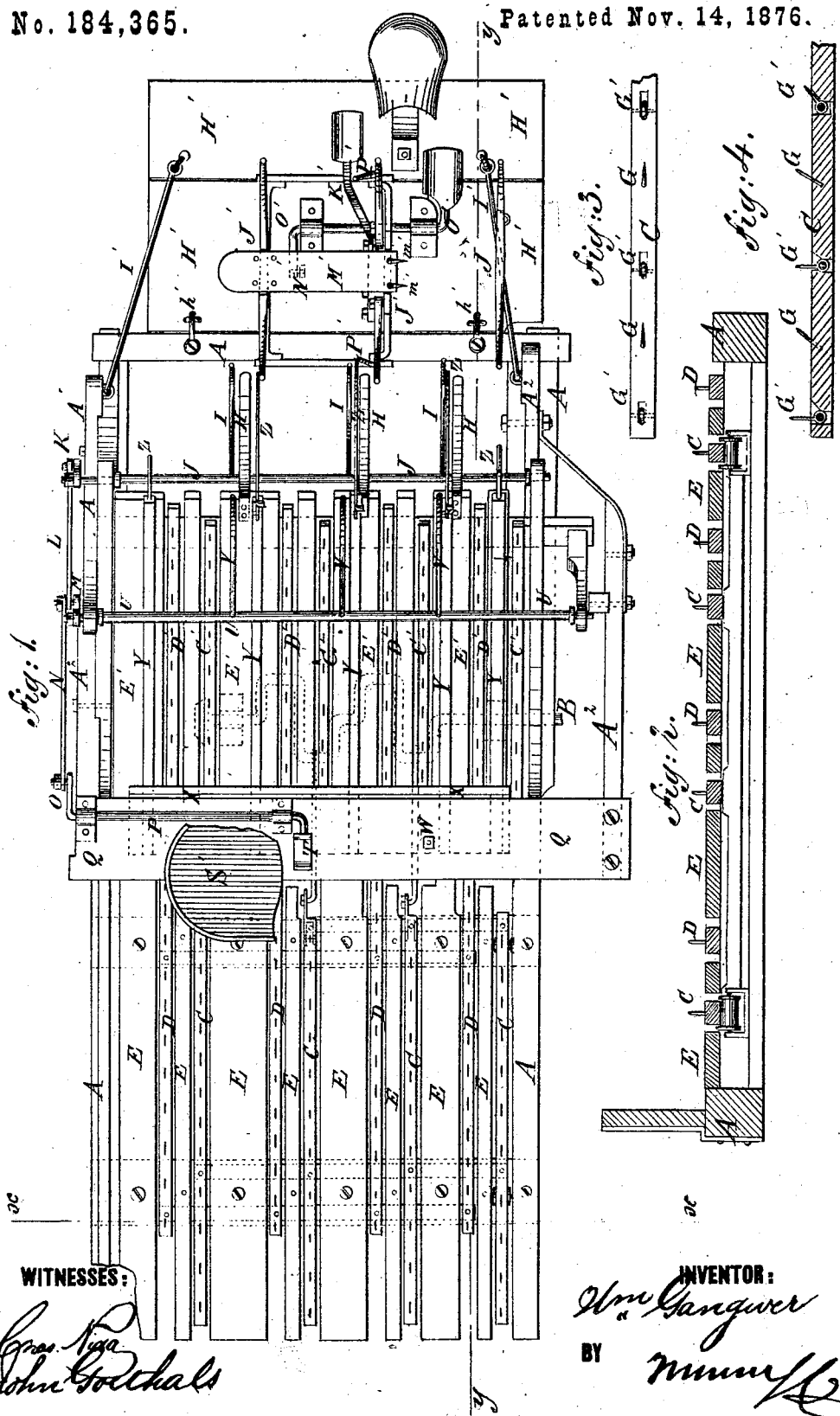

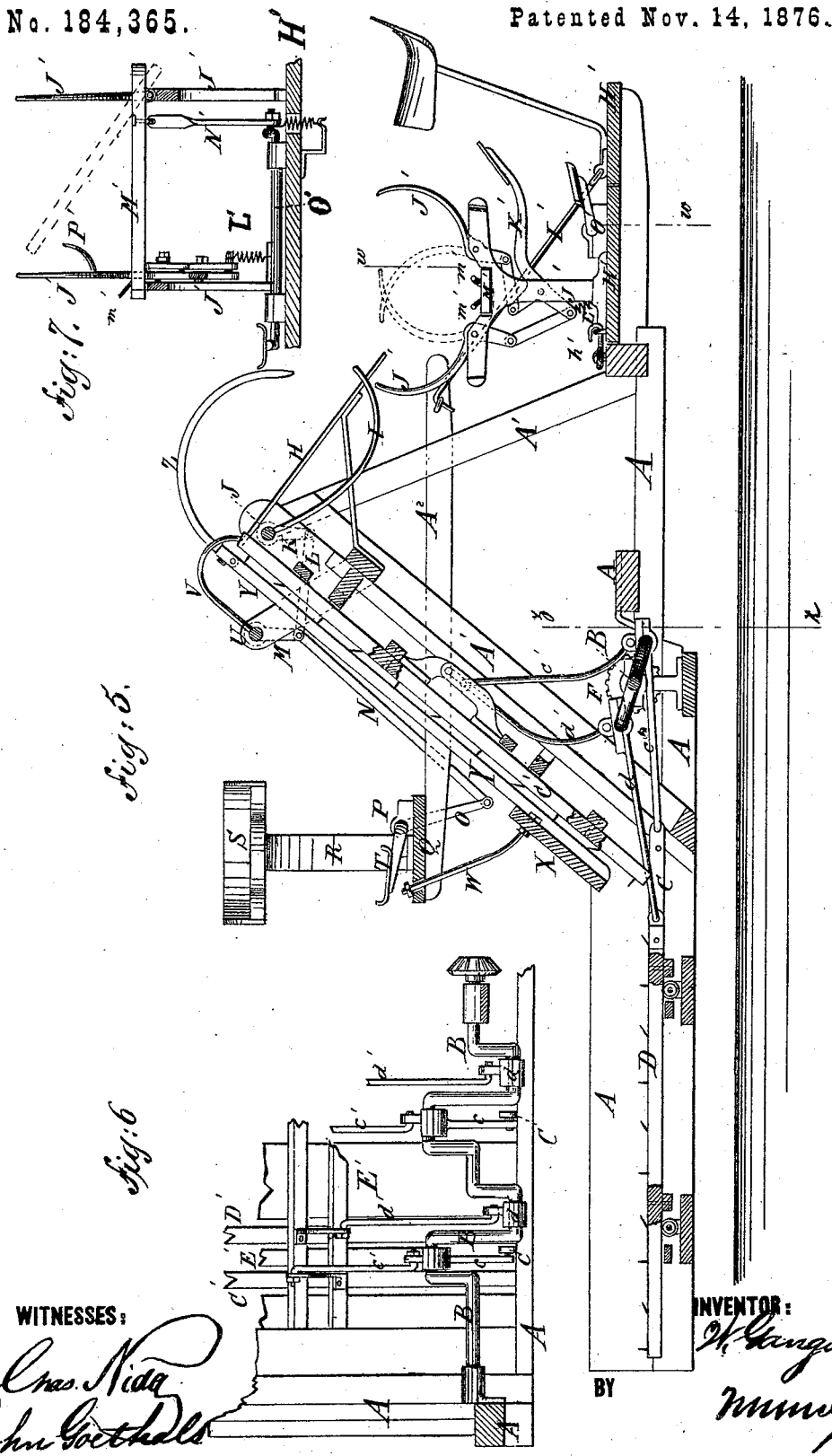

WILLIAM GANGWER, OF MULBERRY, INDIANA.

IMPROVEMENT IN HARVESTERS.

Specification forming part of Letters Patent No. 184,365, dated November 14, 1876; application filed April 25, 1876.

*To all whom it may concern:*

Be it known that I, WILLIAM GANGWER, of Mulberry, in the county of Clinton and State of Indiana, have invented a new and Improved Harvester, of which the following is a specification:

Figure 1, Sheet 1, is a top view of a part of a harvester to which my improvement has been applied. Fig. 2, Sheet 1, is a vertical cross-section of the platform, taken through the line $x\ x$, Fig. 1. Fig. 3, Sheet 1, is a top view of a portion of one of the harvester-rakes. Fig. 4, Sheet 1, is a detail longitudinal section of a portion of one of the platform-rakes. Fig. 5, Sheet 2, is a vertical section of the machine, taken through the line $y\ y$, Fig. 1. Fig. 6, Sheet 2, is a detail section, taken through the line $z\ z$, Fig. 5, showing the double crank and its connecting-rods. Fig. 7, Sheet 2, is a detail section of the binding device, taken through the line $w\ w$, Fig. 5.

The object of this invention is to furnish improved harvesters which shall be so constructed as to enable the cut grain, as it falls upon the platform, to be conveniently removed and deposited in gavels in a receiver, and compressed, ready for binding, and will enable the bound bundles to be readily thrown from the machine.

The invention will first be described in connection with the drawing, and then pointed out in the claims.

A represents the frame-work of the harvester, which is made with an upwardly-inclined part, A′, at the inner end of the horizontal platform. E is the horizontal platform, and E′ is the inclined platform, which are slotted to receive the horizontal bars C D and the inclined bars C′ D′. Each set of the bars C D C′ D′ is connected by cross-bars, as shown in Figs. 2 and 5 and in dotted lines in Fig. 1, so that all the bars of the same set may move together, forming rakes to carry the cut grain across the horizontal platform and up the inclined platform. To the bars of each rake C D C′ D′ are pivoted the ends of two connecting-rods, $c\ d\ c'\ d'$, the other ends of which are pivoted to the double cranks of the shaft B. The shaft B is pivoted to the frame-work A, and has a gear-wheel, F, attached to its end to receive the gearing by which it is connected with the driving mechanism of the harvester. The cranks of the shaft B are so arranged that the two sets C C′ and D D′ of rakes may always be moving in opposite directions. To the bars C D C′ D′ are attached teeth G G′. The teeth G are rigid, and are set with a forward inclination, as shown in Figs. 3 and 4. The teeth G′ are pivoted in short slots, which are so formed that the said teeth may move forward into an inclined position, but cannot move back beyond a vertical position.

By this construction, as the rake-bars move back, the teeth G G′ slide beneath the grain without moving it; but when they move forward they carry the grain with them. As the grain passes over the upper end of the inclined platform E′, it is received upon and slides down the inclined arms H, attached to the platform E′ and frame A′, and is received and held by the curved arms I, the upper ends of which are rigidly attached to the shaft J. The shaft J is pivoted to the frame A¹, and to one of its ends is attached a short crank, K, to which is pivoted the end of a short connecting-rod, L. The other end of the connecting-rod L is pivoted to the short crank M, to which crank is also pivoted the end of a connecting-rod, N. The other end of the connecting-rod N is pivoted to the crank O, attached to the shaft P, which revolves in bearings attached to the platform Q, to which is secured the standards R of the driver's seat S, and which is itself secured to bars A², attached to the frame A A¹ of the machine.

To the shaft P is attached a crank, T, provided with a foot-rest, so that the driver, by keeping his foot upon the crank-arm T, holds the arms I raised into position to receive the grain and hold it upon the inclined arms H until enough has been collected to form a gavel. The driver then raises his foot, and the curved arms I drop, allowing the gavel to fall into the receiver. The crank M is attached to the end of a shaft, U, which works in bearings attached to the frame A¹. To the shaft U are attached curved arms V, the ends of which, when the arms I are dropped to discharge the gavel, drop to the upper edge of the inclined platform E′, and detain the grain until the gavel has been dropped, and they are then raised by raising the said arms I.

W are two or more rods, the upper ends of which are adjustably secured to the platform Q by nuts, and the lower ends of which are rigidly secured to the board or bar X.

To the board or bar X are rigidly attached the lower ends of a series of bars, Y, which pass up along the inclined platform E' between the bars C' D' of the rakes, and to their upper ends are hinged the ends of curved arms Z, which project over the upper edge of the inclined platform E' to meet the curved arms I, to guide the cut grain into proper position as it passes over said edge. The bars Y hold the grain in place while being carried up the inclined platform E', and may be adjusted farther from and closer to said platform, according as the grain is heavy or light, by adjusting the nuts upon the rods W. The curved arms Z are provided with lugs near their hinged ends, which strike against the upper sides of the ends of the bars Y, and prevent the said curved arms Z from dropping down too far. To the side bar of the frame A are attached two short hooks, h', which hook into eyes attached to the inner part of the platform H', which is further secured in place by long hooks I' pivoted to its rear part, and which hook into eyes attached to the rear ends of the bars A². To the forward part of the platform H' are attached three standards, J', the upper ends of which are forked to receive the gavels as they drop from the arms H I. The arms or prongs of the two side standards J' are stationary, but the arms of the central standard J' are pivoted, so that they may be drawn toward each other, as shown in dotted lines in Fig. 5, to compress the gavel and hold it while being bound. The pivoted arms of the central standard J' are connected with a foot-lever, K', which is pivoted to the lower part of said standard, so that the binder, by operating the lever K' with his foot, can draw the arms or prongs together to grasp the gavel. When the lever K' is released the arms or prongs are drawn apart by a spring, L', connected with the forward end of the foot-lever K'. To the rear standard J' is hinged the end of a bar, M', the other end of which rests upon the central standards J'.

To the bar M', near its hinged end, is pivoted the upper end of the rod N', the lower end of which is pivoted to the end of the bent lever O', which is pivoted to the platform, H', in such a position that its other end may be operated by the binder with his foot to raise the free end of the board or bar M', and throw the bound bundle from the machine. To the free end of the bar M' are attached points m', to enter the bundle and prevent the said bar from slipping upon the said bundle. To the sides of the pivoted prongs of the central standard are attached curved fingers or points P', upon which and upon the bar M' is laid a straw band. With this construction when the gavel falls upon the forks of the standards J the binder operates the foot-lever K', which causes the pivoted prongs to compress the gavel. The binder then twists and tucks the ends of the bands, and by operating the lever O' throws the gavel from the machine, which gives him plenty of time to arrange another band before the next gavel is received.

The advantage of combining the rigid and pivoted teeth in the same rake-bar is that the grain is thereby carried without jerking, the rigid teeth holding the grain while the pivoted gather it up.

Having thus described my invention, what I claim as new, and desire to secure by Letters Patent, is—

1. The grain-carrying mechanism, composed of reciprocating bars, provided with alternate rigid and pivoted teeth, substantially as and for the purpose set forth.

2. The bars Y, having curved arms Z hinged at upper end, and provided with legs, in combination with platform E' and arms I, as and for the purpose set forth.

3. The combination of arms J', hinged bar M', and pivoted rods N' with lever O', and platform H, as and for the purpose described.

4. The gavel receiver and compresser, having pivoted prongs J', provided with hooks P', as and for the purpose set forth.

WILLIAM GANGWER.

Witnesses:
DAVID SLIPHER,
PHAON. P. E. STECKEL.